(12) United States Patent
Arnson

(10) Patent No.: US 6,510,315 B1
(45) Date of Patent: Jan. 21, 2003

(54) SYSTEMS AND METHODS FOR MAINTAINING THE VOICE PATH CONNECTION DURING CALLER DISCONNECT OF AN EMERGENCY 911 CALL

(75) Inventor: Jill C. Arnson, Denver, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/412,279

(22) Filed: Oct. 5, 1999

(51) Int. Cl.[7] .............................................. H04M 11/00
(52) U.S. Cl. ........................ 455/404; 455/414; 379/45; 340/503
(58) Field of Search ................................ 455/404, 30.5, 455/554, 414, 555, 403, 415, 3.05; 379/45, 50; 340/500, 503, 506, 524

(56) References Cited

U.S. PATENT DOCUMENTS

| | | | | |
|---|---|---|---|---|
| 5,563,931 A | * | 10/1996 | Bishop et al. ................. | 379/37 |
| 5,841,848 A | * | 11/1998 | Dunn ..................... | 379/112.05 |
| 5,867,571 A | * | 2/1999 | Borchering .................. | 370/373 |
| 6,035,187 A | * | 3/2000 | Franza ......................... | 379/45 |
| 6,185,412 B1 | * | 2/2001 | Pentikainen et al. ......... | 455/404 |
| 6,208,627 B1 | * | 3/2001 | Menon et al. ............... | 370/328 |
| 6,327,347 B1 | * | 12/2001 | Gutzmann ............... | 379/88.02 |
| 6,332,073 B1 | * | 12/2001 | Nilsson et al. .............. | 455/404 |
| 6,366,772 B1 | * | 4/2002 | Arnson ........................ | 375/303 |

* cited by examiner

*Primary Examiner*—Nguyen T. Vo
*Assistant Examiner*—Edan Orgad
(74) *Attorney, Agent, or Firm*—Kenneth J. Cool

(57) ABSTRACT

In one embodiment of the invention, either a CPRU or an RNC in a wireless local loop performs digit analysis to identify whether an emergency 911 call is in progress by setting an internal indicator. When the emergency 911 caller goes on-hook during an emergency call, the CPRU will direct a re-alert of the emergency caller should the internal indicator indicate that the call is an emergency 911 call. In an alternate embodiment, digit analysis is only performed at a CO in a telephone network coupled to the wireless local loop. When the emergency 911 caller goes on-hook during an emergency call, the wireless network places itself into a pending disconnect state, thereby allowing the CO to direct a re-alert of the emergency caller.

20 Claims, 15 Drawing Sheets

SYSTEMS AND METHODS FOR MAINTAINING THE VOICE PATH CONNECTION DURING CALLER DISCONNECT OF AN EMERGENCY 911 CALL

INTRODUCTION

This invention relates to communications, and more particularly relates to methods for maintaining the voice path connection during a caller disconnect of an emergency 911 call.

BACKGROUND OF THE INVENTION

Wireless local loop systems represent a significant improvement in telephone service by providing customers alternative access routes to public telephone networks. Users can continue to use familiar and convenient conventional telephone equipment yet communicate over a wireless communication link. A customer premises radio unit (CPRU) provides the interface between the conventional telephone equipment and the wireless communication link.

The use of conventional phones coupled to a wireless communication link presents a problem, however, because conventional phones receive a dial tone from the Central Office (CO) when the user takes the telephone handset off-hook. In wireless phones the user typically has no dial tone. Rather than hearing a dial tone generated by the CO before dialing, wireless dialing convention dictates that the user enter the desired telephone number and press a SEND button or its equivalent. Only after the SEND button is pressed does the wireless phone begin acquiring a communication channel.

West et al., U.S. Pat. No. 4,658,096, disclose a system for interfacing a conventional phone to a wireless communication link. This system simulates a dial tone when the user goes off-hook. It also performs digit analysis on the dialed number to determine when the last digit has been dialed, storing the dialed digits during this process. After digit analysis indicates when the last digit has been dialed, the system generates a SEND signal transmitting the stored digits to the telephone network.

The above-described technique has a particular disadvantage in that it does not provide a digit analysis that can accommodate changes in numbering schemes. Further, this interface unit requires that the telephone numbering algorithms of the ultimate locale where the interface unit will be used be programmed into the interface unit. As an example, different countries have different numbering formats for the initiation of phone calls. Thus, an interface unit that operates in one country according to the numbering scheme of that country will not necessarily operate properly in another country with a different numbering scheme. Moreover, as the number of telephone users increases, new numbering schemes will be devised to accommodate them. It will be inconvenient and costly to reprogram the digit analysis in interface units already deployed.

Bilgic, et al., U.S. Ser. No. 08/676,975, filed Jul. 8, 1996, the contents of which are hereby incorporated by reference, disclose systems and methods for interfacing conventional phone equipment to a wireless communication link wherein the digit analysis is performed at the wireless base station controller rather than at the CPRU. This allows relatively easy changes to the digit analysis algorithm to accommodate changes in telephone numbering schemes. Because the CPRUs disclosed by Bilgic et al. are robust to numbering scheme changes, these CPRUs are denoted as universal radio controllers (URCs). Not performing digit analysis, the URC transmits the dialed digits to the base station substantially at the same time as they are dialed (denoted Overlap Sending if the digits are sent out-of-band).

Despite the advances demonstrated by Bilgic et al., there remain proposed wireless local loop systems in which digit analysis is performed neither at the base station nor at the CPRU. Instead, these systems perform the digit analysis at the telephone network central office. In such systems, because the CPRU and base station perform no digit analysis, an emergency call is currently treated as an ordinary outgoing call by the CPRU. If the CPRU adheres to DECT (Digital Enhanced Cordless Telecommunications) protocol, all calls, including emergency 911 calls, will be torn down within the wireless network after the user places the handset on-hook or otherwise disconnects. Thus, when a user goes on-hook, the CPRU will begin normal call teardown procedures (by, e.g., sending a CC_RELEASE message with a reason of normal). This presents a problem, however, because the essential element of emergency 911 calls is that the call control (i.e., the ability to disconnect the call—termed Disconnect Supervision) is taken away from the calling CPE party.

For normal calls, the caller and the called party share call control (Disconnect Supervision) in that either party has the power to go on-hook and have the call torn down. In an emergency call, should the caller go on-hook, the public safety answering point (PSAP) then re-rings the on-hook user to reconnect the user. In the wireless local loop environment, such reconnection may not be possible because of the scarcity of available bandwidth and other factors. In addition, the reconnect notification originating at the CO, using a GR-303 interface (Bellcore's GR-303 defines a set of requirements for Integrated Digital Loop Carrier (IDLC) systems) does not contain the telephone number of the emergency caller. Instead, the reconnect notification message contains only alerting information. Under GR-303, the CO is not aware of anything other than a wired line connection and therefore will not have any knowledge about an air link interface and any extra information that would be needed to convey information to the CPRU to reconnect the call.

Thus, there is a need for improved methods for maintaining a voice path connection over a wireless local loop to an emergency caller who has disconnected because the CPRU did not have knowledge of the type of call being placed.

SUMMARY OF THE INVENTION

In one embodiment of the invention, the CPRU is informed during call origination that it will not have call control because the caller is placing an emergency call. This may be accomplished by performing a digit analysis in the CPRU or at the wireless switch (i.e., radio node controller (RNC)). The digit analysis need only identify the digit string corresponding to the emergency call number and may ignore additional digits dialed thereafter. Should the CPE go on-hook during an emergency 911 call, the CPRU may immediately alert the CPE with a predetermined alerting tone, and apply ringback to the far end (of the PSAP).

In an alternate embodiment, neither the CPRU nor the radio node controller (RNC) need identify whether the call being placed is an emergency call. Instead, when the CPE goes on-hook during a call, the CPRU places itself into a Pending Disconnect state but does not release the communication link. Thus, the Pending Disconnect state allows for a possible reconnection of the existing call. Because the CO has performed digit analysis, the CO has identified whether the call is an emergency call. In the event of an attempted emergency call disconnect by the CPE, the central office (CO) sends alerting information to the RNC that is then relayed to the CPRU indicating the ringing tone to be applied to the customer premises equipment (CPE). Two-way voice traffic may resume when the CPE goes back off-hook.

DETAILED DESCRIPTION OF THE INVENTION

Figure 1:
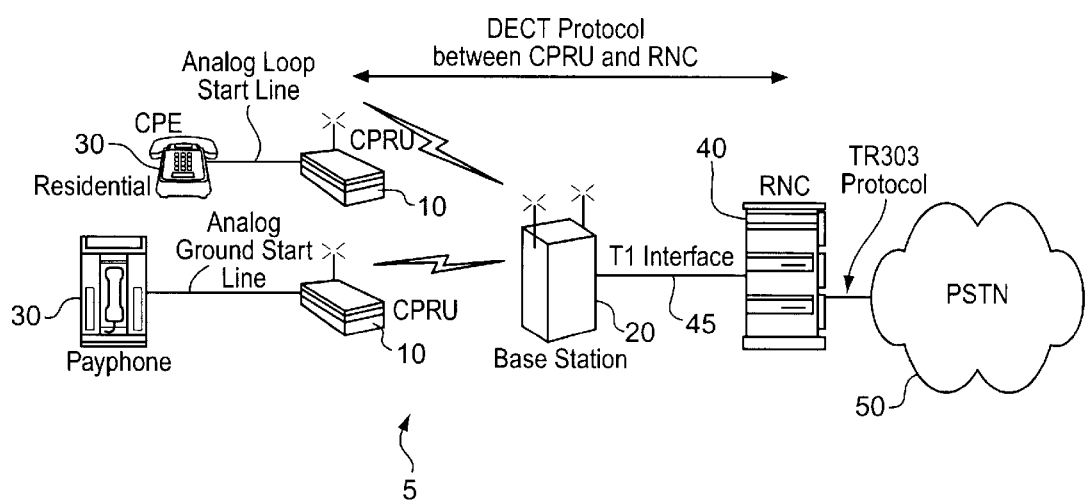
FIG. 1 is a block diagram of wireless local loop communication system.

An example wireless local loop system 5 is shown in FIG. 1. A plurality of CPRUs 10 communicate over a radio link with a base station 20. Such communication can occur using any appropriate wireless communication technique and protocol including, but not limited to, frequency division multiple access (FDMA), code division multiple access (CDMA), spatial division multiple access (SDMA), time division multiple access (TDMA), or any combination of FDMA, TDMA, CDMA, and/or SDMA. CPRUs 10 may be universal radio converters (URCs) which transmit dialed digits substantially at the same time when the customer dials them (denoted Overlap Sending if the digits are transmitted out-of-band).

Standard non-wireless devices 30 generically referred to herein as customer premises equipment (CPE) are coupled to the CPRUs 10. CPRUs 10 function so that customers using CPEs 30 believe they are using "plain old" telephone service (POTS) despite the fact that these customers are actually communicating over a wireless link.

The base station 20 is connected to a radio node controller (RNC) 40 (a type of switch) by a T1 interface line 45 or another suitable trunk. Communication between CPRUs 10, base station 20 and RNC 40 may follow the DECT protocol. RNC 40 interfaces with the public switched telephone network 50 via the telephone central office (CO) (not illustrated) using, in one embodiment, GR-303 Common Signaling Channel (CSC) communication criteria.

Figure 2:
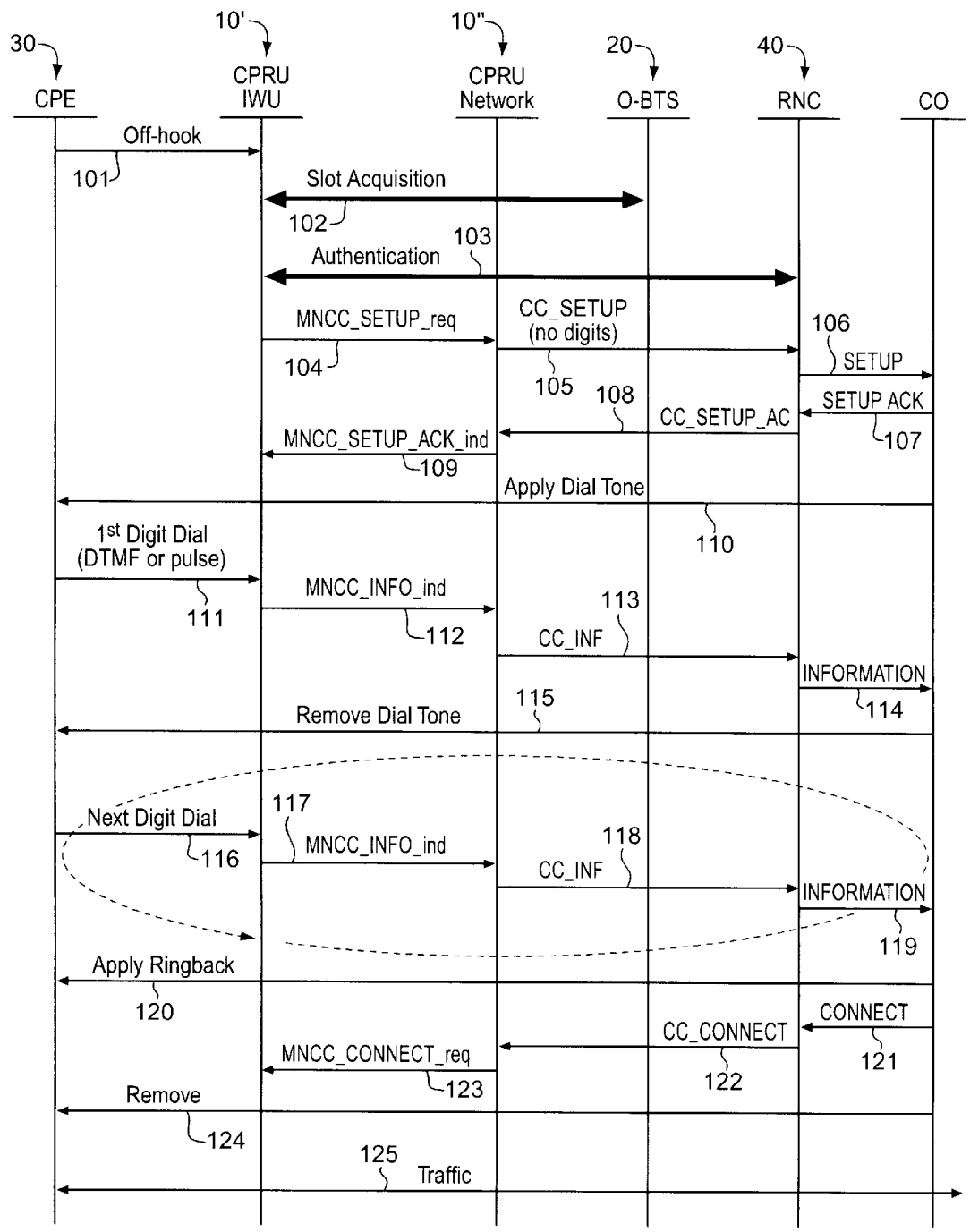
FIG. 2 illustrates the preferred call flow during a prior art process for connecting an ordinary call.

Turning now to FIG. 2, a known method for connecting a call between CPE 30 and the public switched telephone network 50 on the wireless local loop system 5 is illustrated. Note that in this call flow diagram (and those that follow), a line drawn through the central office (CO) indicates a message intended for the PSTN 50. Also, almost all messages sent from any point in the call flow diagrams herein have timers associated with them. Expiration of the timers is generally considered to be an error condition. These error conditions are not shown in most cases because they would make the diagrams and descriptions unduly complicated and confusing for an understanding of the problems inherent in current systems and methods. A few error conditions will be illustrated in the call flow diagrams to follow if the error condition is deemed highly likely to occur. In addition, for the call flow illustrated in FIG. 2 (and those that follow), out-of-band connectivity is assumed so that some tones are generally applied locally. Moreover, Bellcore GR-303 CSC is the protocol used between the CO and the RNC 40. Between CPRU 10 and RNC 40, the DECT standard is used. Note that in the exemplary call flow illustrated in FIG. 2 and the call flow diagrams thereafter, the preferred communication system operates with the GR-303 and DECT protocols. A particular call flow pattern for non-GR-303 and non-DECT systems may be constructed by modifying the call flow pattern and messages according to the principles and techniques disclosed and described herein.

At step 101, the customer takes the handset of CPE 10 off-hook to generate a conventional DC current change. Upon detecting the off-hook signal, CPRU 10 seizes a radio resource from the base station (BTS) 20 by acquiring a timeslot at step 102. Should the CPRU 10 be unable to obtain a radio resource, it applies a reorder tone to the CPE 10 for a predetermined period and aborts the call. At step 103, authentication procedures occur between the CPRU 10 and the central office to determine if a dialtone should be requested. After authentication is completed, the CPRU interworking unit (IWU) 10' sends a SETUP request to the CPRU network layer 10" in step 104. Alternatively, the SETUP message may be sent before the authentication procedure is performed such that the sending of the SETUP message begins the authentication procedure. At step 105, the CPRU network layer 10" sends a CC_SETUP message to the radio node controller (RNC) 40 with no digits to indicate that a new call is being requested.

At step 106, RNC 40 sends a SETUP message to the CO. In response at step 107, the CO delivers a SETUP ACKNOWLEDGE message to RNC 40 to indicate the facility that is to used for the call. At step 108, RNC 40 acknowledges the CC_SETUP message from the CPRU networking layer 10" with a CC_SETUP_ACK message, which in turn informs the CPRU IWYU 10' of receipt of the CC_SETUP_ACK message by sending a MNCC_SETUP_ACK indication at step 109.

The CO may apply dialtone to the CPE line connection in step 110 anytime after the CO has sent the SETUP ACKNOWLEDGE message. The customer, in response to hearing the dialtone, may dial a digit using either touch tone or dial pulse dialing at step 111. Should the customer fail to dial a digit within a dialtone timeout period, the CO removes the dialtone and tears the connection down. As part of this release, the message sent to the CPRU will indicate that it is to apply a receiver off-hook tone for a predetermined period, and the air resource is released. Assuming a customer has dialed a digit, the IWU of CPRU 10 sends the dialed digit via a MNCC_INFO message to the networking layer of CPRU 10 in step 112. Upon receiving this first dialed digit, in step 113 the networking layer of CPRU 10 sends a CC_INFO message communicating this digit to RNC 40. Also, the Basic Service Information Element is set to Normal setup. At step 114, the RNC 40 communicates the dialed digit to the CO via an INFORMATION message.

Upon receipt of the first dialed digit, at step 115 the CO removes the dialtone from the CPE. Next, in step 116, the customer dials the next digit in the number the customer desires to call. Upon receipt of this digit, the IWU sends the dialed digit to the CPRU networking layer 10" in an MNCC_INFO message at step 117. The CPRU network layer 10" sends this digit to RNC 40 in a CC_INFO message at step 118. Each keypad IE contains a single digit. RNC 40 forwards the dialed digit to the CO in an INFO message at step 119. Steps 116 through 119 are repeated until the CO has received enough digits to complete the call. The CO will determine what type of call has been dialed, such as an emergency 911 call, international call, etc. This process is termed digit analysis. If at step 119, the CO times out waiting for enough digits to be dialed to complete a call, the CO will attempt to complete the call with the digits already dialed.

At step 120, an Information message from the CO directs the RNC to apply ringback tone to the CPE 10. When the called party answers at step 121, the CO sends a CONNECT message to the RNC 40. In turn, at step 122, RNC 40 delivers a CC_CONNECT message to the CPRU networking layer of 10". Upon receipt of the CC_CONNECT message, the CPRU networking layer 10" passes along the information to the CPRU IWU 10" at step 123. At step 124, the CO removes the ringback tone from CPE 30. Finally, at step 125, the connection is cut through at all network layers so that voice traffic may begin.

In the call flow depicted in FIG. 2, all digit analysis is performed at the CO. Neither the CPRU 10 nor the RNC 40 perform any digit analysis. Thus, the call flow for connecting a call is the same in FIG. 2 whether the call is a normal call or an emergency 911 call.

Figure 3:
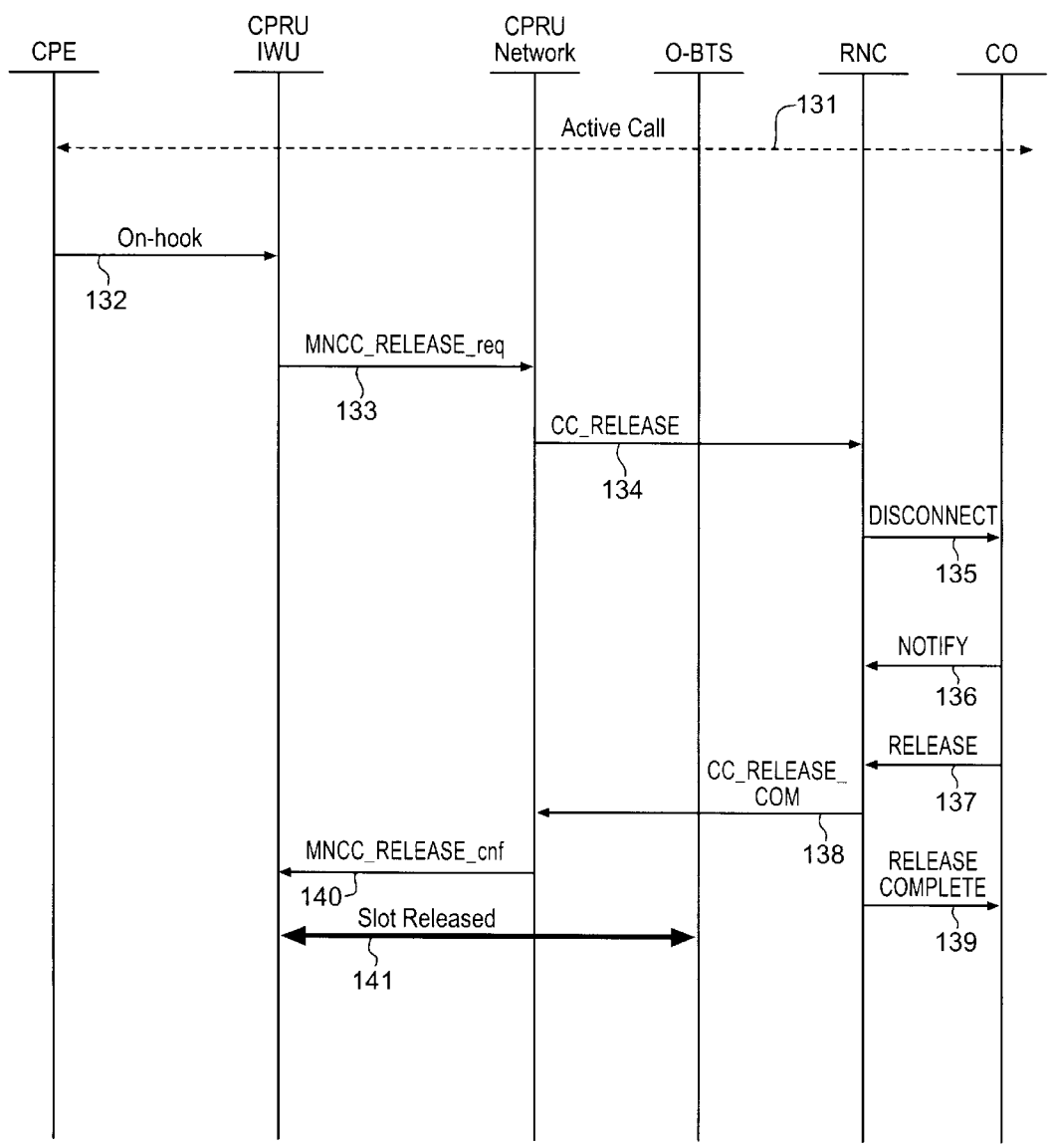
FIG. 3 illustrates the prior art preferred call flow during a CPE disconnect of a normal non-emergency call.

Turning now to FIG. 3, a normal (non-emergency) call disconnect by the CPE 30 is illustrated. Neither the CPRU 10 nor the RNC 40 has any knowledge of the type of call in progress. At step 131, an active call that was connected as illustrated in FIG. 2 is in progress. At step 132, the customer goes on-hook at CPE 30 to begin the disconnection process. Recognizing the on-hook condition, the CPRU IWU 10' sends a RELEASE request to the CPRU network layer 10" at step 133. In turn, at step 134, the CPRU network layer 10" sends a CC_RELEASE message to RNC 40. Upon receiving the RELEASE message, RNC 40 sends a DISCONNECT message to the CO at step 135 indicating that the connection is being released.

At step 136, the CO sends a NOTIFY message to RNC 40 to wait while the CO determines whether to release the call. After the CO determines it may release the call, it sends a RELEASE message to the RNC 40 at step 137. In turn, RNC 40 sends a CC_RELEASE_COM message to the CPRU network layer 10" confirming the release at step 138. Then, at step 139, RNC 40 sends a RELEASE COMPLETE message to the CO indicating completion of the call teardown. At step 140, the CPRU network layer 10" informs the CPRU IWU that the call has been released. Finally, at step 141, CPRU 10 and base station 20 complete release of the over-the-air (OTA) link.

Figure 4:
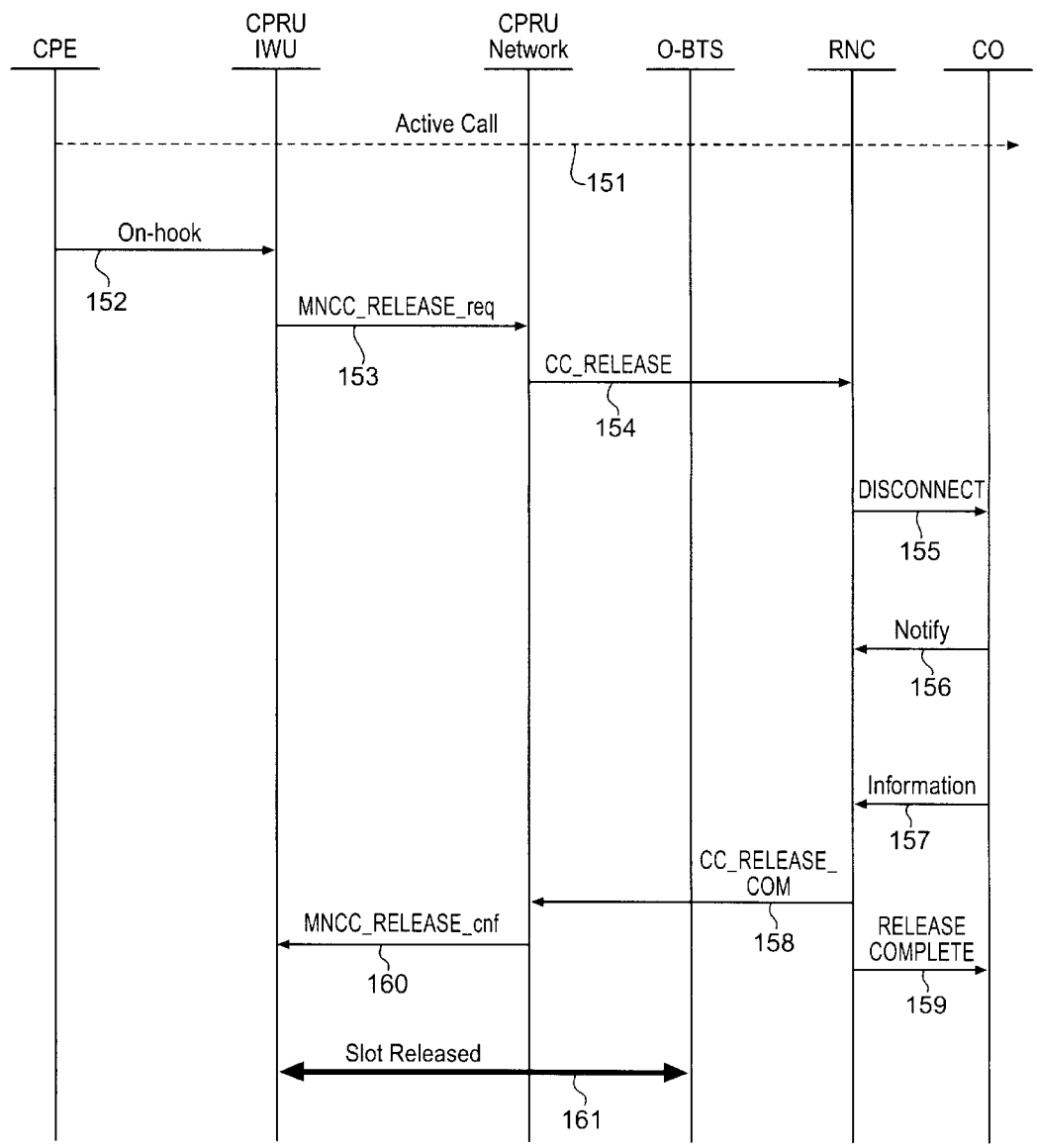
FIG. 4 illustrates the call flow during a CPE disconnect of an emergency 911 call under current prior art DECT implementation.

The unmodified disconnect call flow for an emergency 911 call is illustrated in FIG. 4. Because the CPRU 10 and RNC 40 have no knowledge of the type of call being placed, steps 151 through 156 are identical to the call teardown steps already described for FIG. 3. Thus, at step 157, RNC 40 is expecting a RELEASE message from the CO so that call teardown may be completed. However, because the call is an emergency call, call control remains only with the public safety answering point (PSAP). Thus, at step 157, the CO sends the RNC 40 an INFORMATION message with a Signal IE instructing RNC 40 to reconnect CPE 30. This INFORMATION message does not contain the digits of the telephone number for CPE 30. There is the possibility that the call reference value (CRV) would be sufficient to reconnect the call. Regardless of whether the CRV is sufficient, however, under DECT protocol, the information contained in the INFORMATION message at step 157 is incompatible with the DECT call state and would be considered an error and ignored by RNC 40. Thus, the following steps are the most logical ones taken in the currently implemented DECT standards.

At step 158, RNC 40 waits for a RELEASE message from the CO until the timer times out so that RNC 40 sends a RELEASE message to the networking layer of CPRU 10. At or about the same time, at step 159, RNC 40 sends a call teardown complete (RELEASE COMPLETE) message to the CO to indicate that all resources have been released for the call. At step 160, the CPRU network layer 10" informs the CPRU IWU layer that the call has been released. Finally, at step 161, CPRU 10 completes the release of the OTA link.

Should the emergency caller take the CPE 30 off-hook again presents an additional issue to be considered for the call flow illustrated in FIG. 4. Because the call is in the process of being torn down, CPRU 10 would consider this off-hook signal to be an exception and an invalid stimulus of the call state. The CPRU 10 would not pass the off-hook information to the CO. The caller would not hear dial tone and would likely return to the on-hook condition to once again take CPE 30 off-hook.

Thus, FIG. 4 illustrates a problem with current DECT implementation should the CPE party go on-hook during an emergency 911 call. A key point to notice is that neither CPRU 10 nor RNC 40 perform any digit analysis. The CO does not send any information to indicate whether a call is an emergency call. Thus, as illustrated above, after CPE 30 goes on-hook during a 911 emergency call, disconnect supervision on the call is not under the control of the PSAP and the call is torn down.

In one embodiment, the present invention solves the CPE 30 on-hook disconnect of a 911 call problem by performing digit analysis at either the CPRU 10 or at the RNC 40. With respect to this embodiment, the CPRU 10 may send dialed digits to the base station substantially at the same time as the caller dials them at the CPE 30.

Consider the case in which digit analysis is performed at the RNC 40. Should the digit analysis performed by the RNC 40 indicate that the CPE 30 is attempting an emergency 911 call, there are several messages by which the RNC 40 may notify the CPRU 10 that it does not have call control. All these messages dictate that a RELEASE can only come from the called party—the PSAP. These messages include:

1.) An IWU-INFO message with an IWU-to-IWU IE with the Protocol Discriminator set to "GSM Recommendation 04.08, element" (010001) with the Emergency Setup message type IE (1110) as the contents delivered to CPRU 10.

2.) An INFO message with an Escape to Proprietary Information Element (IE) indicating that the call type is "emergency" delivered to CPRU 10.

3.) A NOTIFY message with an Escape to Proprietary Information Element (IE) indicating that the call type is "emergency" delivered to CPRU 10.

Figure 5A:
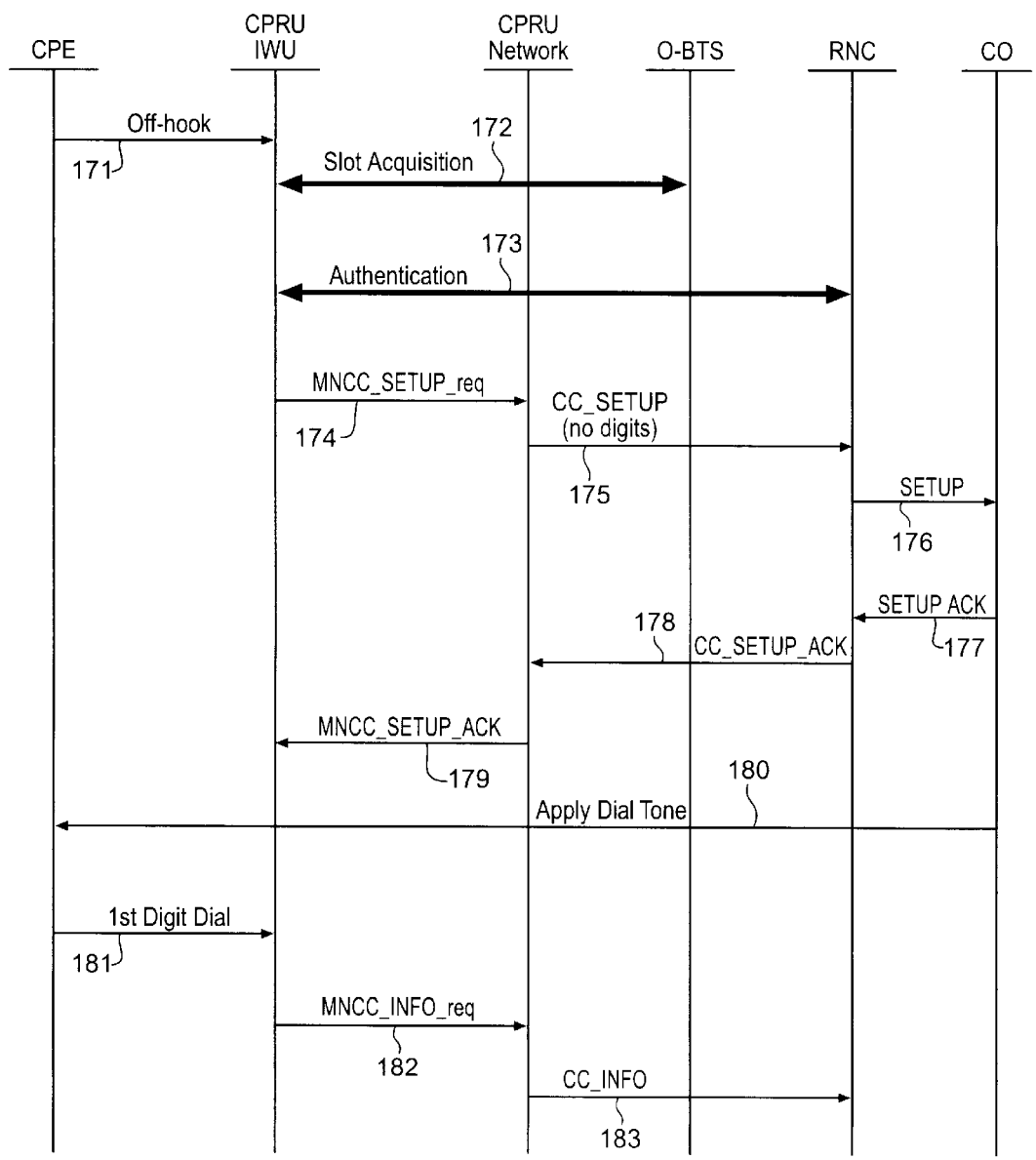
FIGS. 5a, 5b, and 5c illustrate the call flow during a CPE call origination according to one embodiment of the present invention in which the RNC performs digit analysis.
Figure 5B:
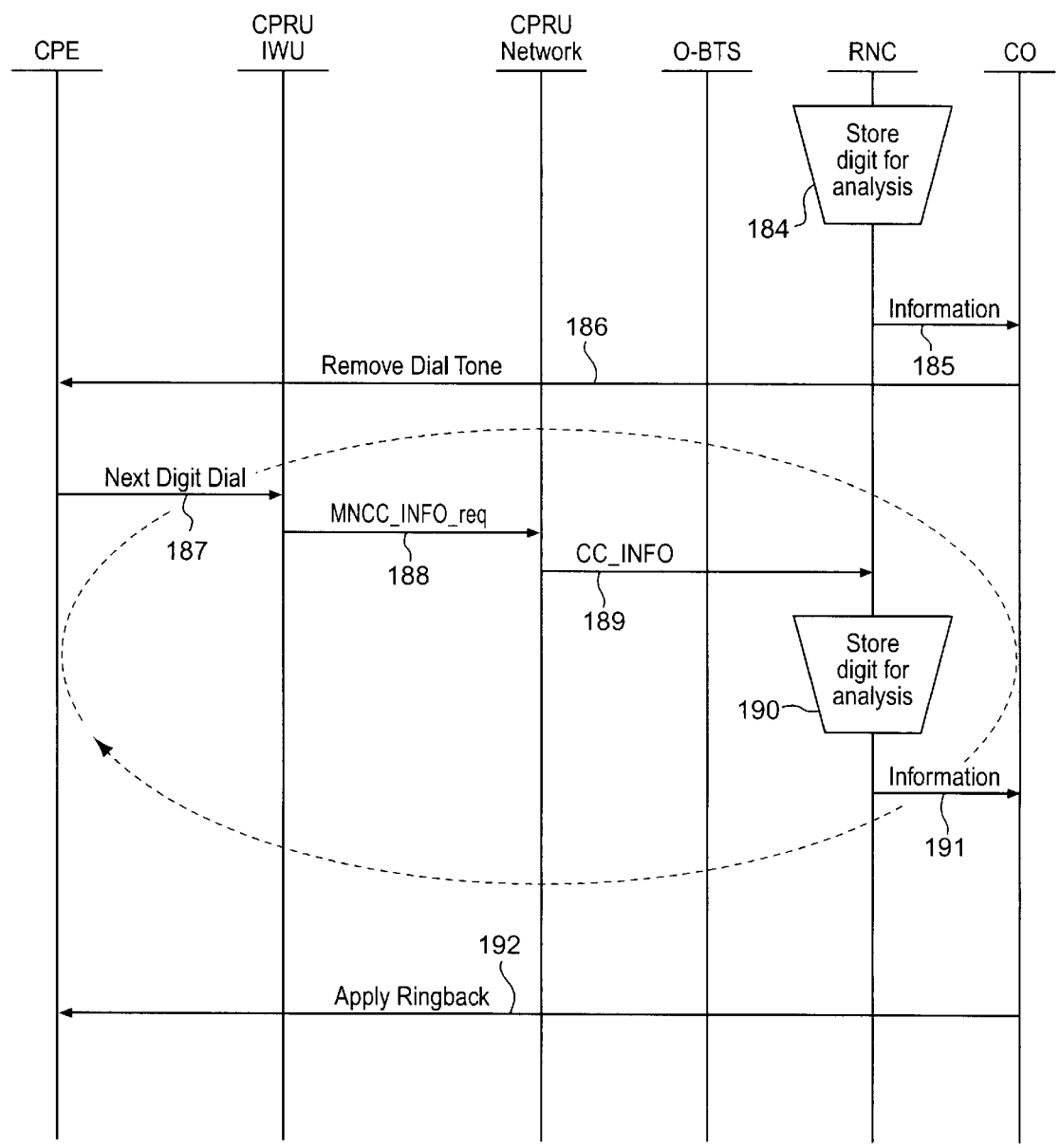
Figure 5C:
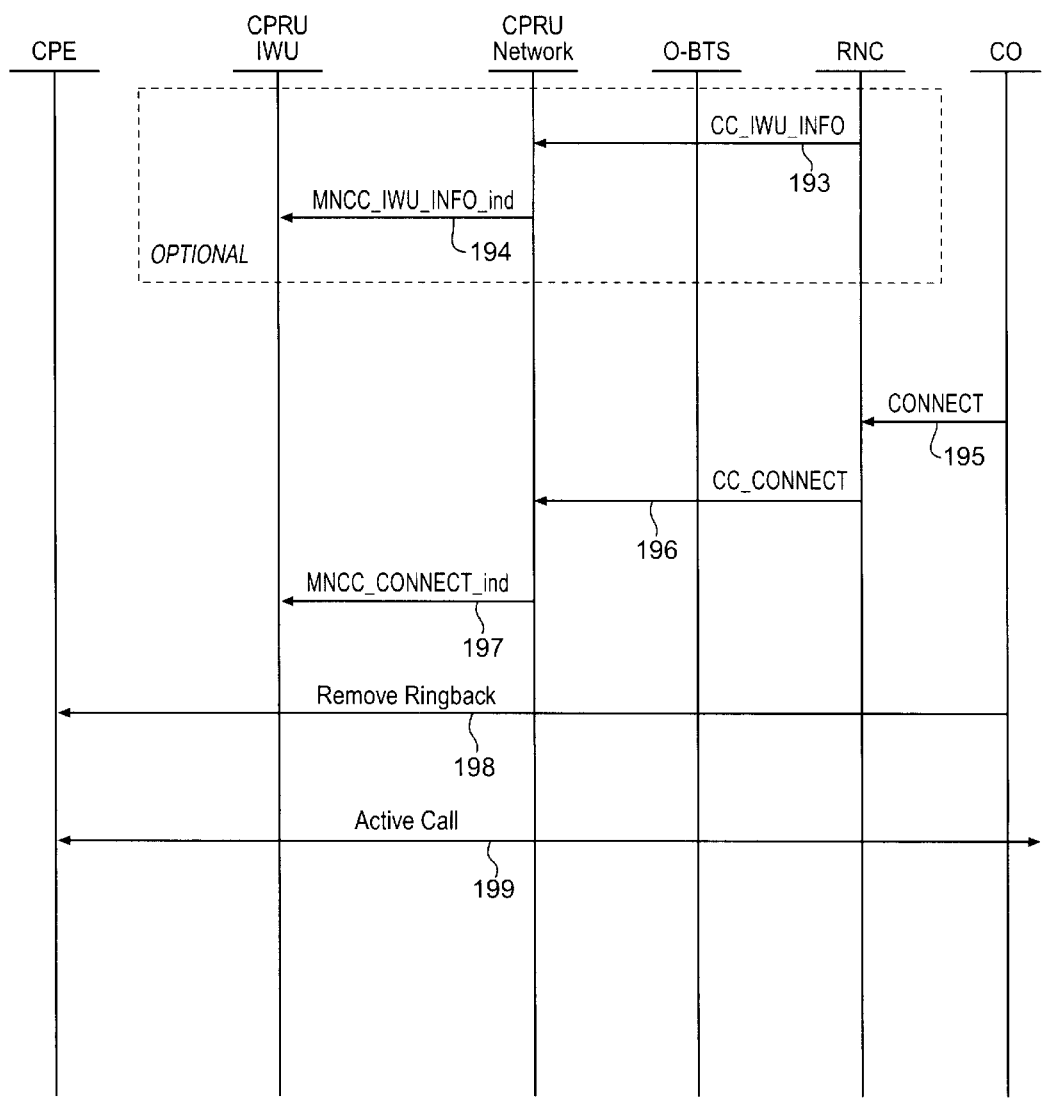

Turning now to FIGS. 5a, 5b and 5c, the call flow during an emergency 911 call originating at CPE 30 when RNC 40 performs the digit analysis according to one embodiment of the invention is illustrated. Steps 171 through 183 are the same as the first thirteen steps of the ordinary DECT call origination call flow illustrated in FIG. 2. Thus, at step at 172, should the CPRU 10 be unable to obtain a radio resource, it applies a reorder tone to CPE 30 for a predetermined time. At step 181, should the user not dial the first digit within a predetermined period, the CPRU will teardown the connection and release the air resource.

FIG. 5b continues the call flow of FIG. 5a. Assuming the user did dial a digit, at step 184, RNC 40, receiving the first dialed digit, examines it to determine if the digit is part of a predetermined emergency call digit string. If it is, RNC 40 stores it for further digit analysis. Alternatively, the RNC may simply store the digit for future analysis. At step 185, the RNC 40 forwards the dialed digit to the CO in an INFORMATION message. Upon receipt of this first dialed digit, the CO removes the dial tone from CPE 30 at step 186. Steps 187 through 189 are the same as steps 116 through 118 discussed with respect to FIG. 2. At step 190, RNC examines the next dialed digit to determine if the digit is part of a predetermined emergency call digit string. If it is, RNC 40 stores it for further digit analysis. Alternatively, the RNC may simply store the digit until the number of digits dialed matches the number of digits for the emergency digit string. At that time the string would be evaluated to determine if the dialed digit string was that for an emergency call. At step 191, RNC 40 forwards the next dialed digit to the CO in an INFORMATION message. Steps 187 through 191 are repeated until the CO has received enough digits to complete the call. If, however, the CO times out while waiting for additional dialed digits, it will attempt to complete the call with the digits already dialed if possible. Upon completion of the call, the CO applies a ringback tone to CPE 30 at step 192.

FIG. 5c continues the call flow illustrated in FIG 5b. At step 193, if the RNC 40 has determined through digit analysis that the call is an emergency 911 call, it sets an internal indicator that it does not have call control after the call has been answered. In addition, the RNC 40 sends an IWU-INFO message with an IWU-to-IWU IE with the Protocol Discriminator set to "GSM Recommendation 04.08, element" (010001) with the Emergency Setup message type IE (1110) as the contents to the CPRU networking layer 10". Alternatively, as described above, the RNC 40 could notify CPRU 10 of the emergency call state by sending an INFO message with an Escape to Proprietary Information Element (IE) that indicates the call type is "emergency" or by sending a Notify message to the same effect.

At step 194, a CC_IWU-INFO_ind message is passed to the IWU of CPRU 10 so that the appropriate internal indicators may be set to identify the call in progress as an emergency 911 call. Thus, after the call is answered, the calling party using CPE 30 will not have call control. Steps 195 through 199 are the same as steps 121 through 125 described with respect to the call flow illustrated in FIG. 2.

Figure 6A:
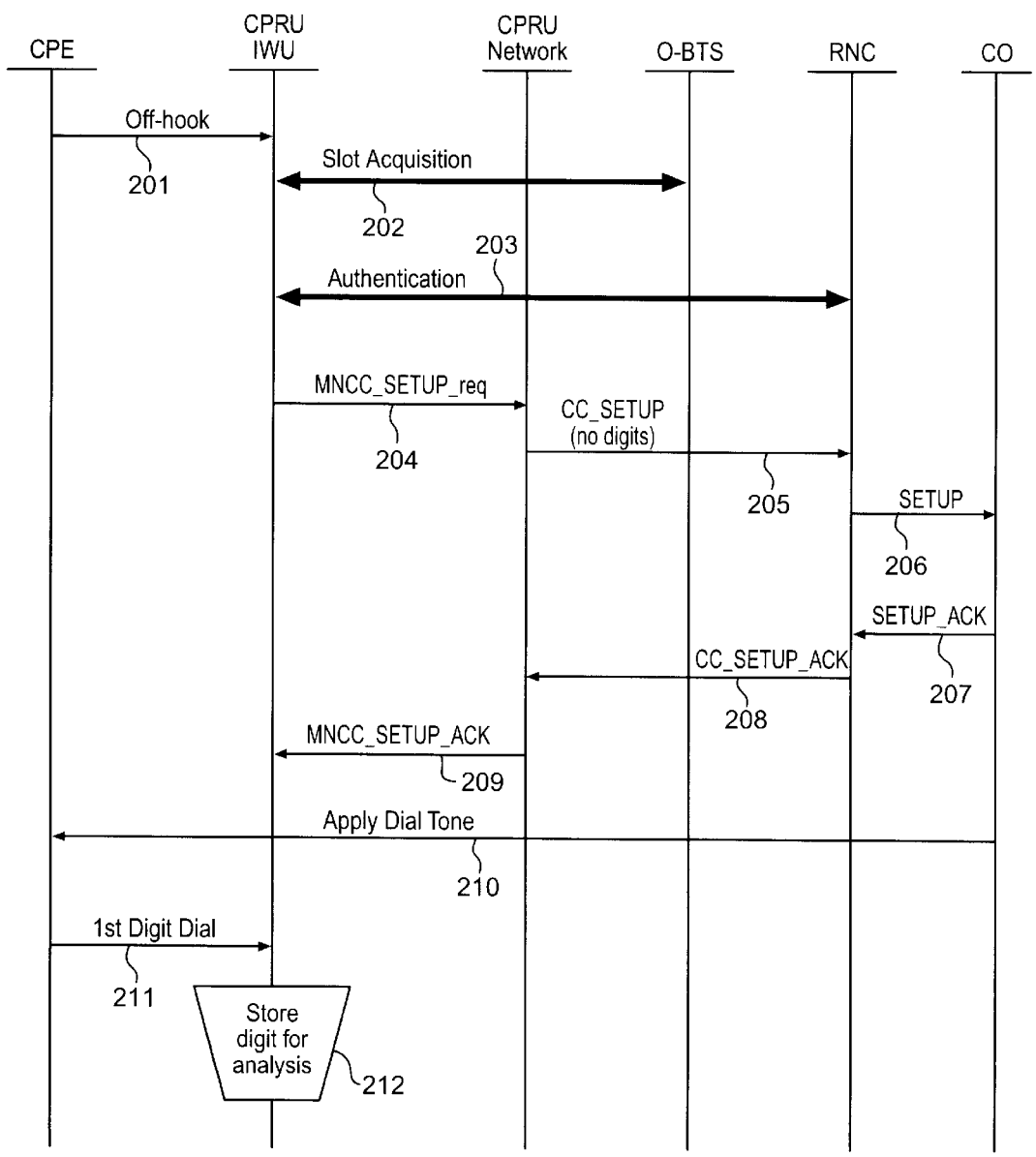
FIGS. 6a, 6b, and 6c illustrate the call flow during a CPE call origination according to one embodiment of the present invention in which the CPRU performs digit analysis.
Figure 6B:
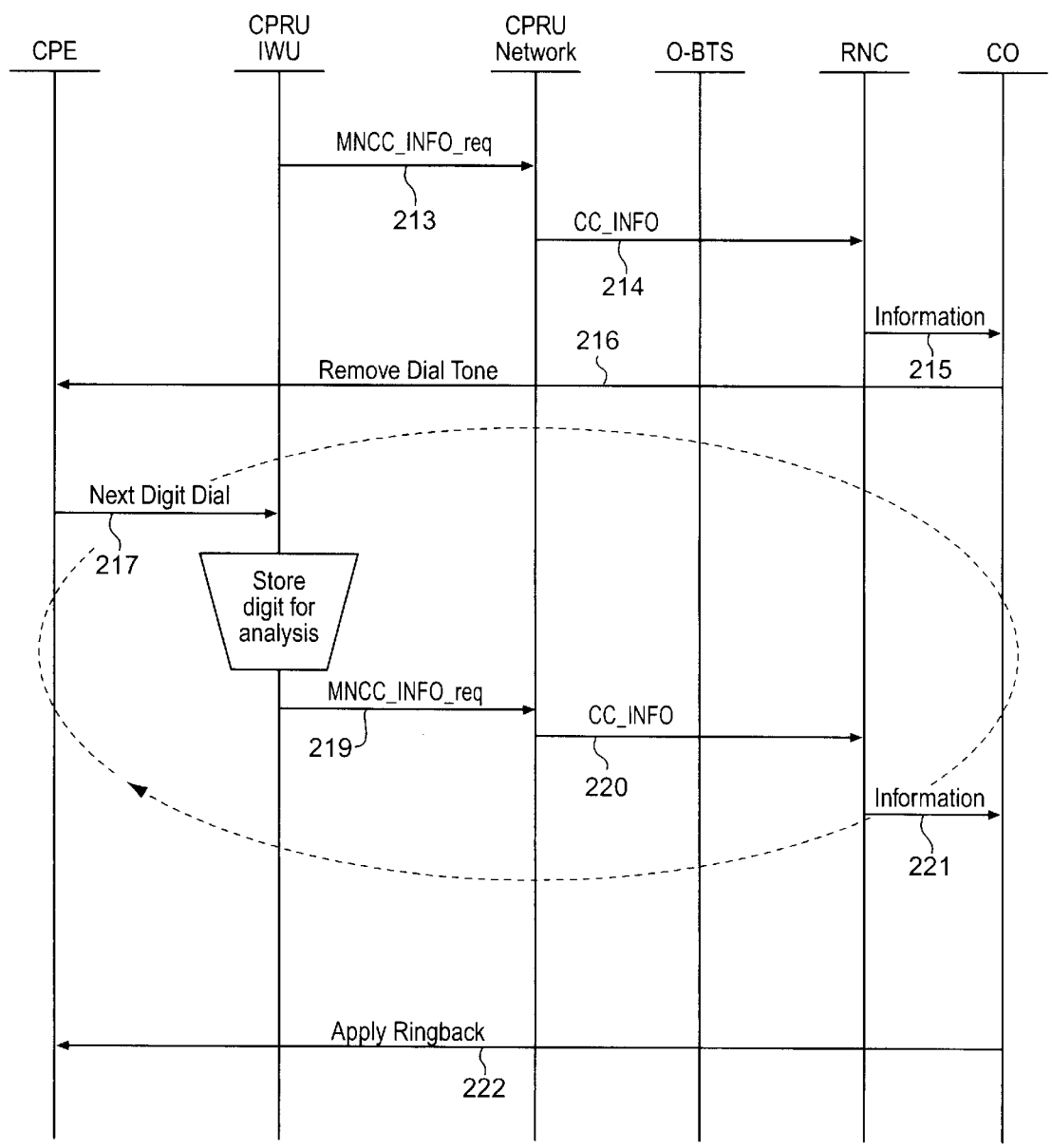
Figure 6C:
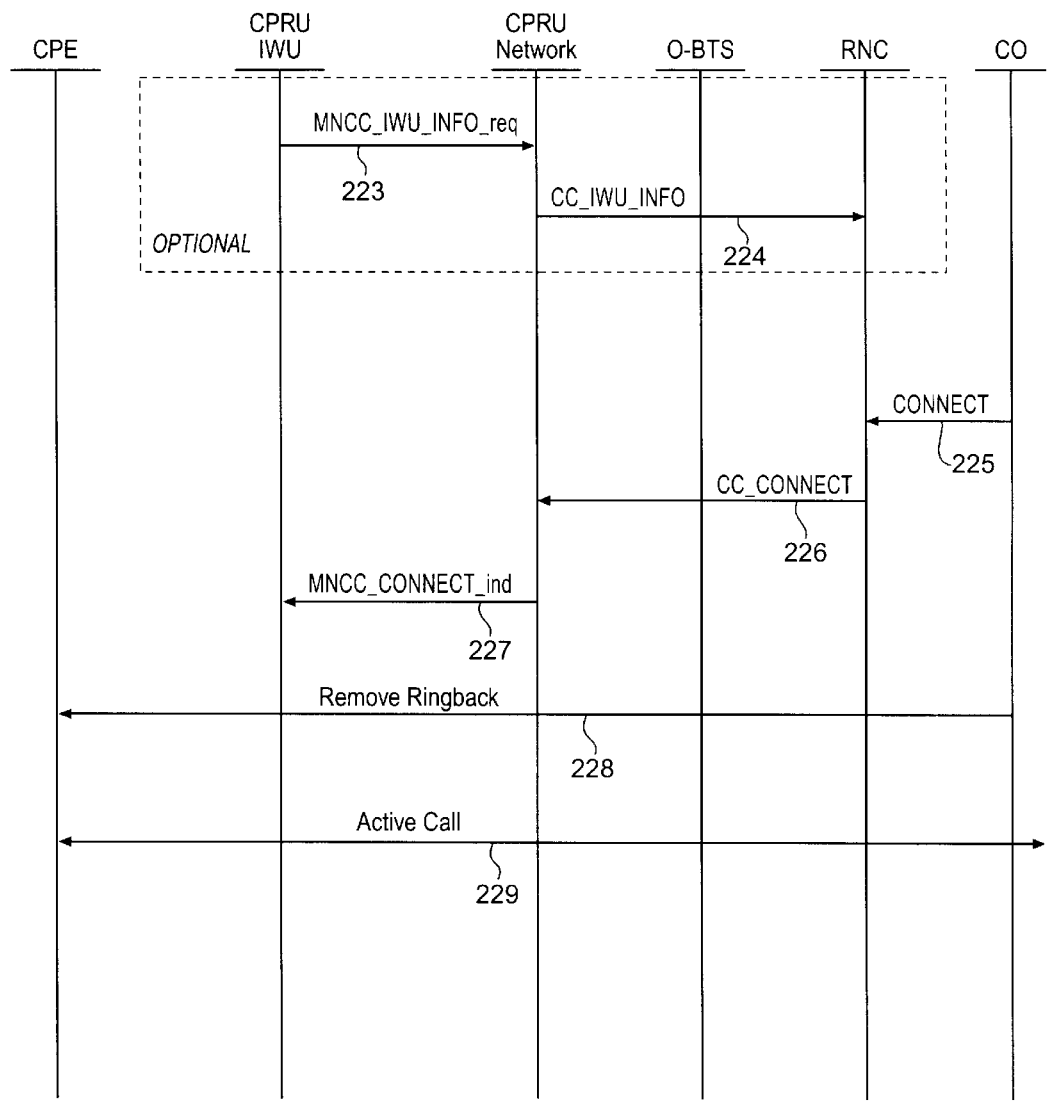

Turning now to the embodiment of the invention in which the CPRU 10 performs a rudimentary digit analysis, FIGS. 6a, 6b and 6c illustrate the call flow during an emergency 911 call originating at CPE 30. The call flow is very similar to that illustrated in FIGS. 5a and 5b. The differences lie in where the digit analysis is performed and the direction of the IWU-INFO messages. Thus, steps 201 through 211 are identical to steps 171 through 181 for the corresponding RNC digit analysis call flow illustrated in FIG. 5a. At step 212, the CPRU 10 examines the dialed digit to determine if the digit is part of a predetermined emergency call digit string. If so, the CPRU 10 stores the digit for further digit analysis.

FIG. 6b continues the call flow of FIG. 6a. The transmission of the dialed digit and the removal of the dial tone in steps 213 through 216 occurs as previously described for steps 182 through 183 and steps 185 through 186 for the embodiment of the invention in which the RNC 40 performs a rudimentary digit analysis. At step 217, the next dialed digit is entered on the CPE 30. At step 218, the CPRU 10 examines this dialed digit to determine if the digit is part of a predetermined emergency call digit string. If so, the CPRU 10 stores the dialed digit for 6further digit analysis. The dialed digit is transmitted to the CO in steps 219 through 221 identically as in steps 213 through 215. Steps 217 through 221 are repeated until the CO has received enough digits to complete the call. When the CO has connected to the called party at step 222, it applies ringback to the calling party. Ringback tone is applied in-band from the CO to the CPE 30.

The subsequent call flow continues on FIG. 6c. At step 223, if the CPRU 10 has determined through digit analysis that the call is an emergency 911 call, it sets an internal indicator that it does not have call control after the call has been answered. In addition, the CPRU 10 would then send an INFO request with an IWU-to-IWU IE with the Protocol Discriminator set to "GSM Recommendation 04.08, element" (010001) with the Emergency Setup message type IE (1110) as the contents. Alternatively, as described above, the CPRU 10 could notify the RNC 40 of the emergency call state by sending an INFO message with an Escape to Proprietary Information Element (IE) that indicates the call type is "emergency" or by sending a Notify message to the same effect.

At step 224, the CC_INFO information is passed to the RNC 40 so that it can set appropriate internal indicators that the call in progress is an emergency call. The completion of the voice path connection occurs in Steps 225 through 229 as previously described for steps 195 through 199 in the embodiment in which the RNC 40 performs a rudimentary digit analysis.

Regardless of whether the digit analysis occurs at the RNC 40 as illustrated in FIGS. 5a and 5b or at the CPRU 10 as illustrated in FIGS. 6a, 6b, and 6c, the CPRU 10 may then initiate a CPE re-alert should the CPE 30 go on-hook during an emergency 911 call. This CPRU-directed re-alert of the CPE 30 will now be discussed.

Figure 7:
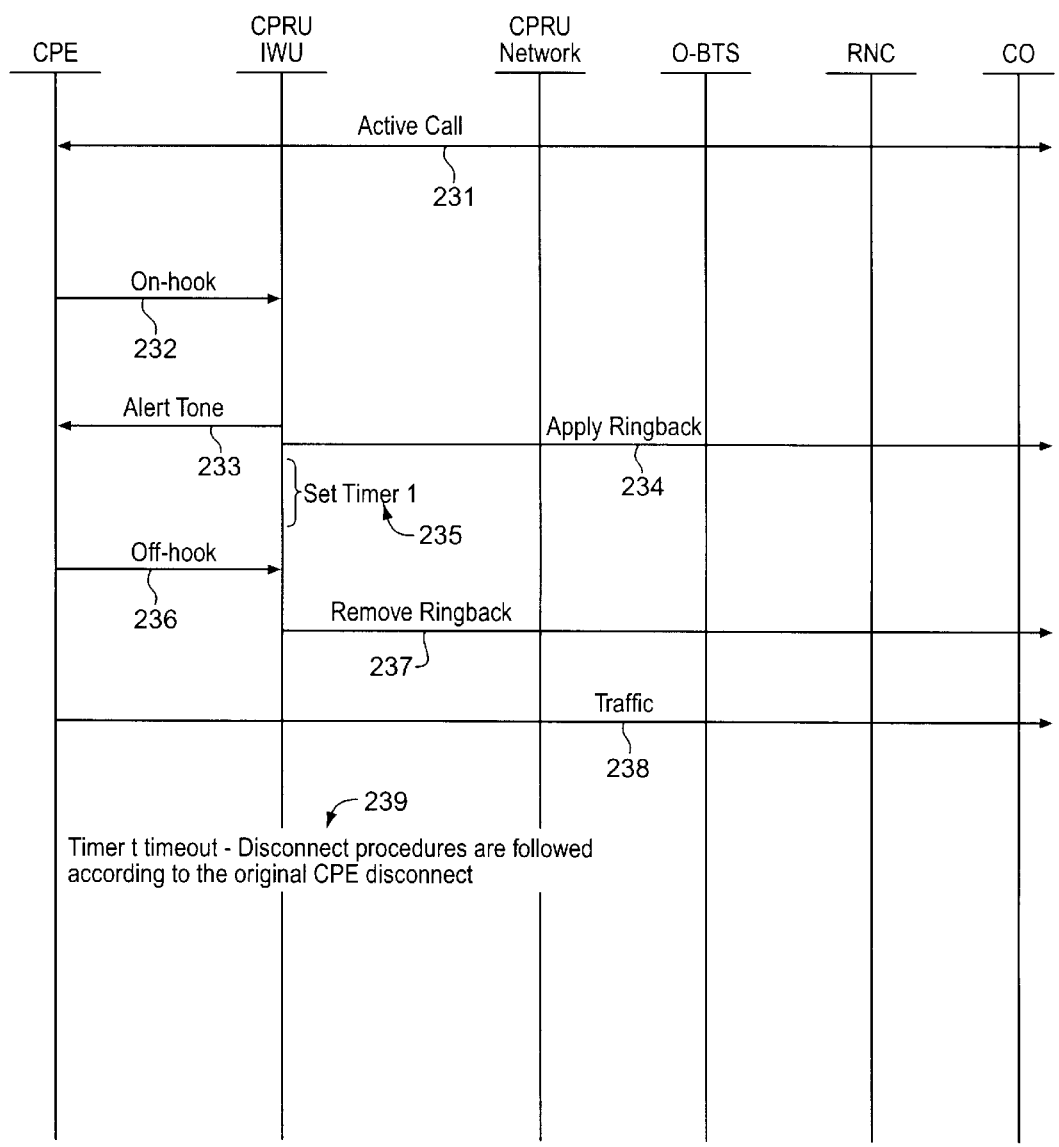
FIG. 7 illustrates the call flow during a CPRU-directed alert of a CPE that has gone on-hook during an emergency 911 call.

FIG. 7 illustrates the call flow for a CPRU-directed ringback to re-alert a CPE 30 that has gone on-hook during an emergency 911 call. At step 231, an active emergency 911 call is in progress. At step 232, the user at CPE 30 goes on-hook. CPRU 10 then checks its call control indicator at step 233 and determines it does not have call control. This call control indicator may have been set by a rudimentary digit analysis performed either at CPRU 10 or at RNC 40 as previously described. Because CPRU 10 does not have call control, it alerts CPE 10 with a predetermined ringing tone. At step 234, ringback is applied to the PSAP to indicate that the CPE has gone on-hook and is being alerted. At or around the same time as the ringback and alerting tones are applied, at step 235 a timer is started. At step 236, CPE goes off-hook to answer the alerting ringing tone. Then, the alerting and ringback tones are removed at step 237. Voice traffic may then resume at step 238. Should the timer expire (preferably the timer at step 235 will expire in the range of 30 minutes) before the user at CPE 30 goes back off-hook to answer the alerting ring applied at step 233, then call disconnect procedures may be initiated as previously illustrated in FIG. 4. Although FIG. 7 illustrates a CPRU-directed alerting of the CPE, those of ordinary skill will appreciate that alternate alerting methods may be implemented, given that the CPRU has identified that it does not have call control. For example, either the RNC or the CO could initiate an alerting of the CPRU after an on-hood condition has been detected, using the principles of the present invention.

In an alternate embodiment of the present invention, the CO will direct the alerting of the CPE 30 should the CPE 30 go on-hook during an emergency 911 call. Neither the CPRU 10 nor the RNC 40 need perform digit analysis. Thus, the CPRU does not identify whether it has call control or not. The DECT protocol is modified so that the CPRU IWU 10' and the CPRU networking layer 10" enter a "partial release" state whenever the CPE goes on-hook during an active call. Therefore, the prior art problems discussed earlier during conventional CPE disconnect during an emergency 911 calls are avoided—the radio resource is never relinquished nor does either the CPRU 10 nor the RNC 40 begin normal teardown procedures.

Figure 8A:
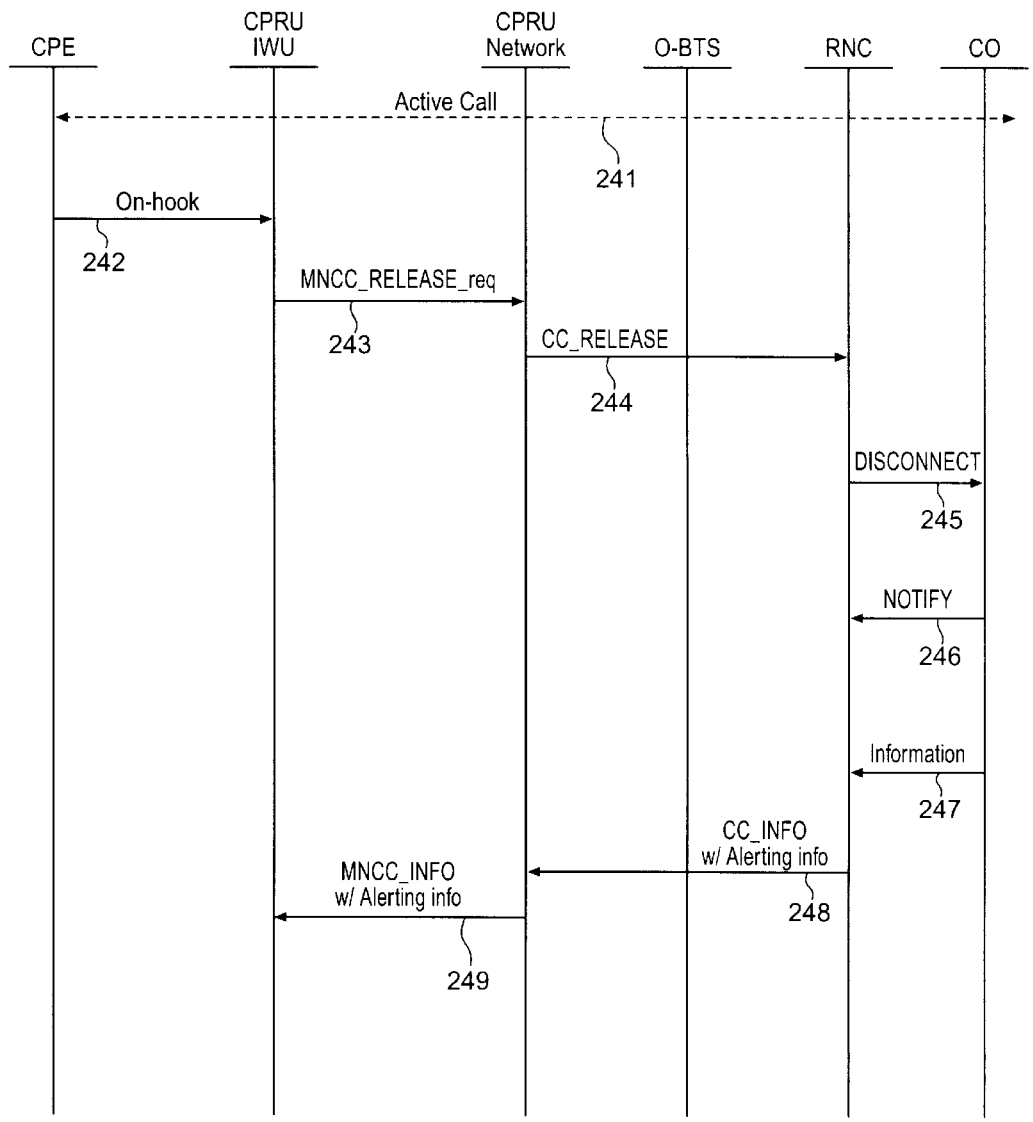
FIGS. 8a and 8b illustrate a CO directed ringback of the CPE.
Figure 8B:
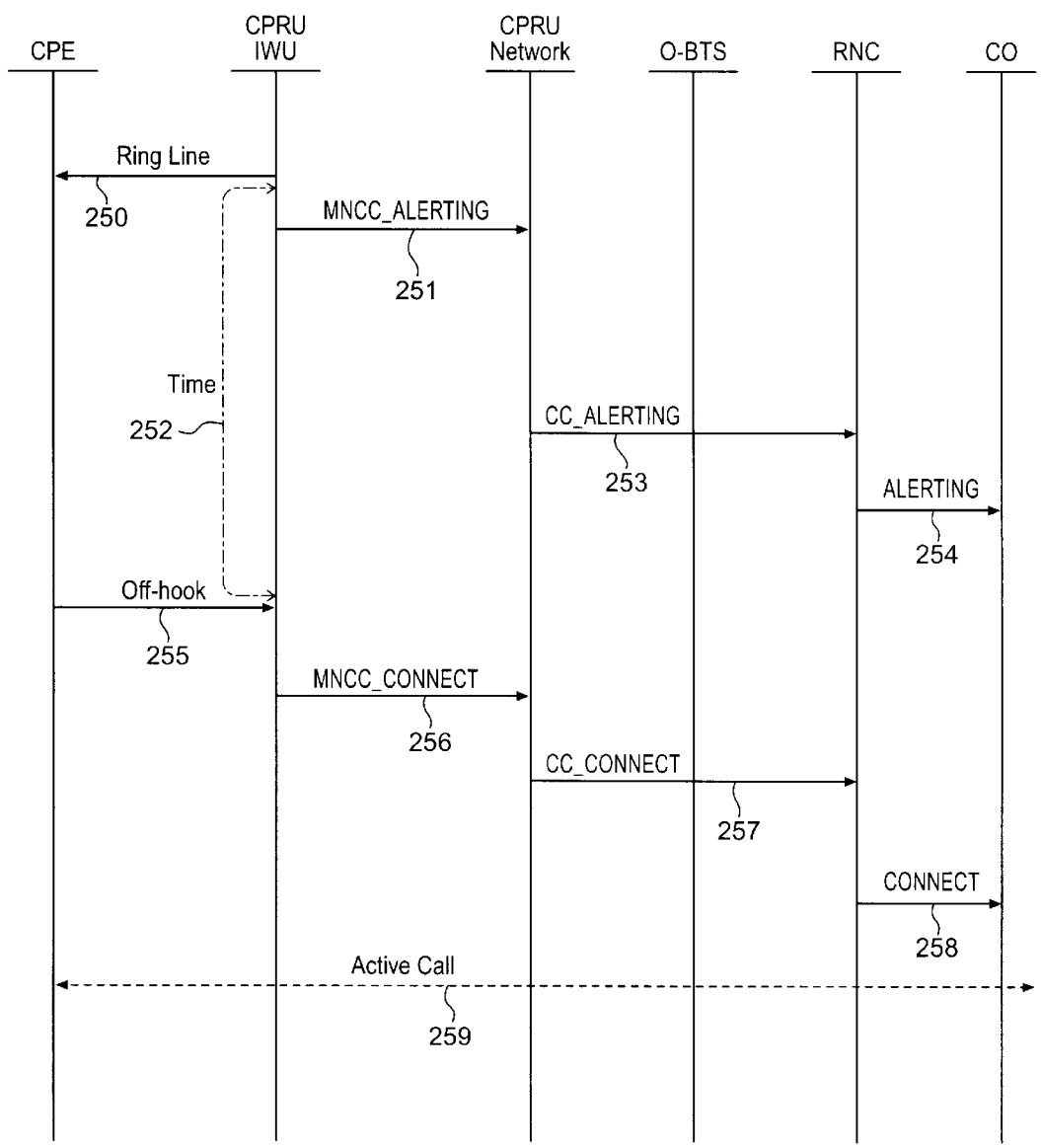

FIG. 8a and 8b illustrate the call flow during a CO-directed alert of the CPE 30 when a CPE 30 on-hook occurs during an emergency 911 call according to one embodiment of the invention. At step 241, an active emergency 911 call is in progress until, at step 242, the CPE caller goes on-hook. At step 243, the CPRU sends a RELEASE request to the network layer, and places itself in a pending disconnect state. The RELEASE will always contain the Reason code Partial Release. This will enable the Link Control Entity to set a timer (LCE.02) for up to ten (10) seconds before the link is released, and to allow for the reconnect. Alternatively, an entirely new timer of longer duration, may be enlisted. In the preferred embodiment using a DECT protocol between the CPRU 10 and the RNC 40, a new state would have to be added to the DECT protocols stack, preferably a RECONNECT_PENDING state. At step 244, the CPRU network layer 10" sends a CC_RELEASE message to the RNC 40 and places itself in a new DECT disconnect pending state (e.g., RECONNECT_PENDING). At step 245, the RNC 40 receives the CC_RELEASE and then sends a DISCONNECT to the CO indicating that the connection is being released. In response, at step 246, the CO sends a NOTIFY message to the RNC 40 to wait while it determines whether to release the call. After determining that the call is an emergency 911 call, the CO sends an INFORMATION message to the RNC 40 indicating that the CPE 30 is to be re-alerted and specifying the alerting tone to be provided at step 247. At step 248, the RNC 40 passes the alerting information in a CC_INFO message containing a Signal IE indicating what ringing cadence is to be provided to the CPE 30, and changes to an alerting state. It may also pass other proprietary information at this point if necessary. At step 249, the CPRU networking layer 10" passes the information to the CPRU IWU 10" with an MNCC_ALERTING indication, and changes to an alerting state.

FIG. 8b continues the call flow of FIG. 8a. At step 250, the CPRU 10 provides ringing tone to the CPE 30 in accordance to the cadence specified in the Signal IE. In response, the CPRU IWU layer notifies the CPRU network layer that the CPE 30 is being alerted with an MNCC_ALERTING request at step 251. At or about the same time, a timer at step 252 begins timing a timeout period prescribed by the CO in which the CPE 30 must answer. At step 253, the CPRU 10 forwards the notification to the RNC 40 that the CPE 30 is being alerted. At step 254, the RNC 40 sends an ALERTING message to the CO to indicate that the CPE 30 is being rung. At step 255, the CPRU 10 detects the off-hook of the CPE and, at step 256, removes the ringing and the off-hook condition is transmitted to the CPRU network layer via an MNCC_CONNECT request. Upon receiving this request, the CPRU network layer sends the off-hook CC_CONNECT message to the RNC 40 at step 257. In turn, at step 288, the RNC 40 then passes the CONNECT information to the CO. Finally, at step 259, the CO removes ringback from the far end of the connection and 2-way voice traffic in the previously established emergency 911 call resumes.

The CO-directed alert of the CPE 30 during an emergency 911 call disconnect illustrated in FIGS. 8a and 8b assumes that the user will go back off-hook at step 255. Nothing, however, prevents the user from going off-hook previous to this step (after step 243). Such a scenario is denoted as premature off-hook.

Figure 9A:
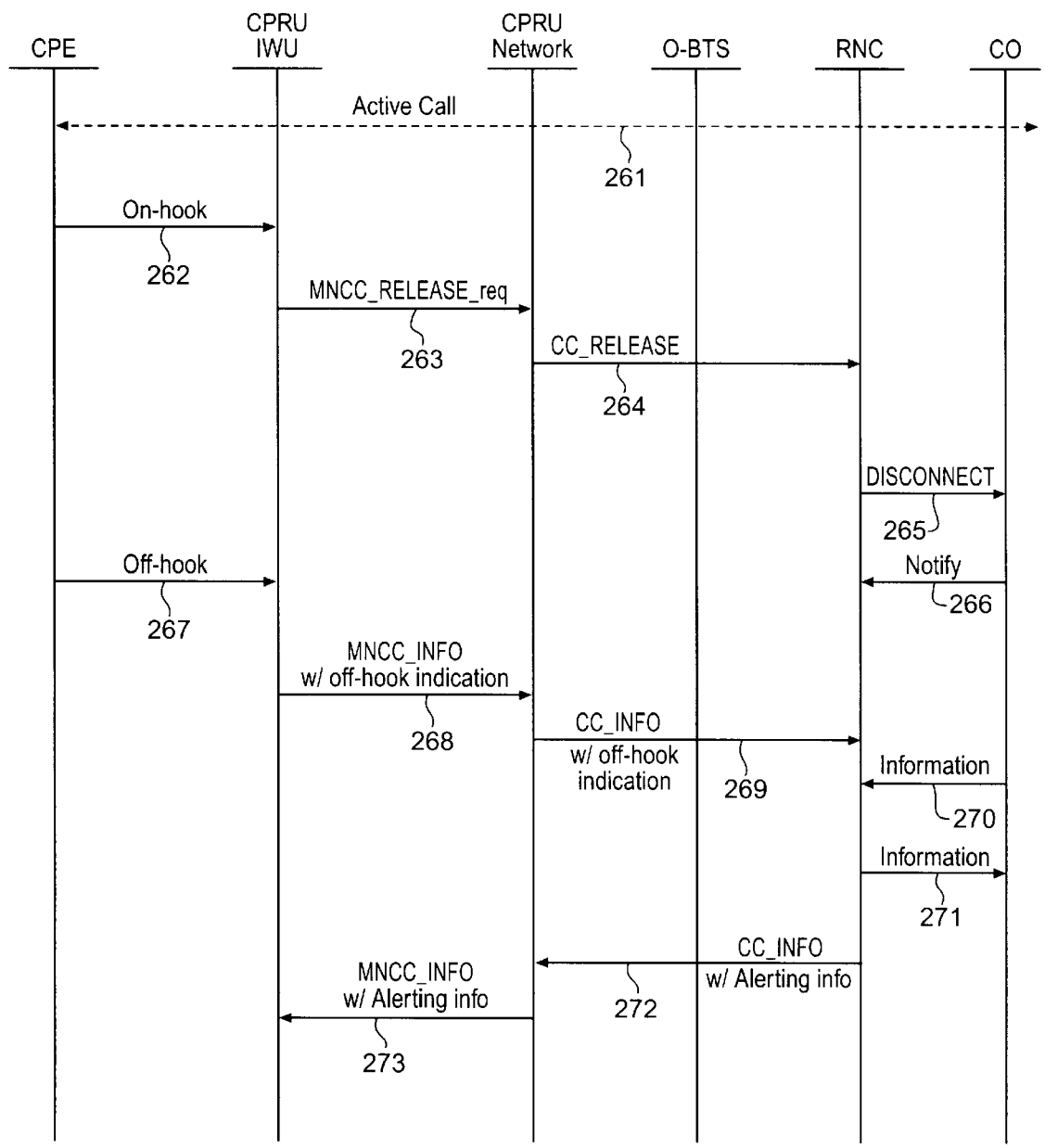
FIGS. 9a and 9b illustrate a CO directed ringback of the CPE wherein the CPE has gone back off-hook during the attempted call tear down procedure.
Figure 9B:
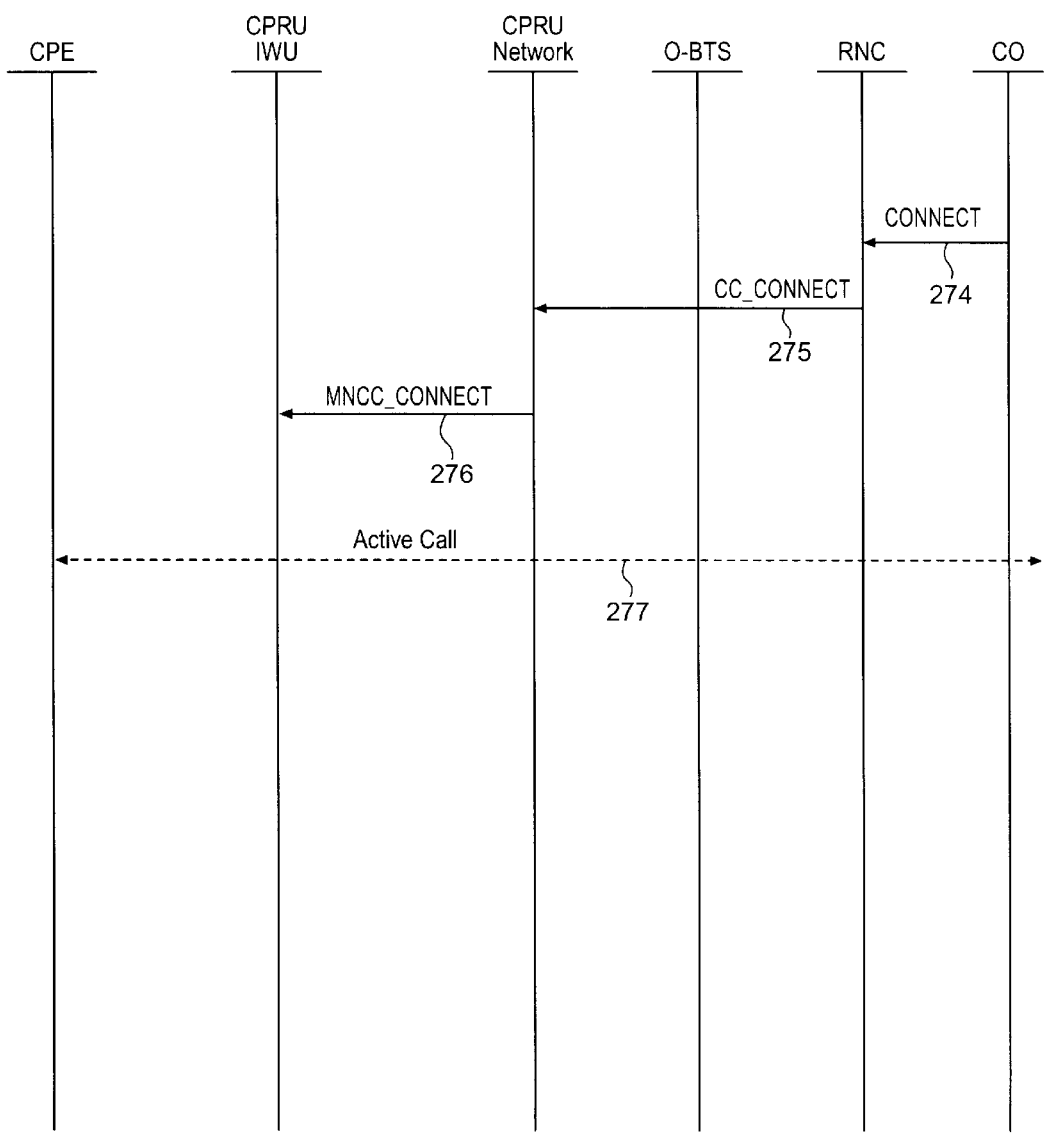

Turning now to FIG. 9a and 9b, a call flow for a premature off-hook during a CO-directed alert of the CPE 30 according to one embodiment of the invention is illustrated. Steps 261 through 266 occur identically as described for steps 241 through 246 in FIG. 8a. At step 267, the CPE 30 goes off-hook. This is treated as a true off-hook as opposed to a flash (an invocation of supplementary call features that are addressed at the CO) or a hit (a very short duration on-hook/off-hook combination) due to the amount of time the CPE 30 was on-hook to send the release messaging. At step 268, the off-hook indication is transmitted to the network layer of the CPRU in an MNCC_INFO message. An INFO message is sent because the state is not the IDLE state. In the IDLE state a SETUP message would normally be sent. At step 269, the off-hook indication is conveyed to the RNC 40 in a CC_INFO message. In the meantime, at step 270, the CO, not yet knowing that the CPE 30 has gone back off-hook, sends an INFORMATION message to the RNC 40 indicating that the CPE 30 is to be re-alerted and specifying the alerting tone to be provided. At or about the same time, the CO is providing ringback to the far end party. At step 271, the RNC 40 passes the off-hook information to the CO, not yet having processed the INFORMATION message from the CO. The RNC 40, receiving the CC_INFO message containing the Signal IE indicating what ringing cadence is to be provided to the CPE 30 at step 272, treats the message as an error for the state, since it knows that the CPE 30 has gone off-hook. It will ignore the message, and possibly log an error. If, however, the RNC 40 has not yet received the off-hook indication from the CPRU 10, it will pass this message along to the CPRU 10. The INFORMATION message from the CO and the CC_INFO message from the CPRU 10 are asynchronous and therefore, with respect to time, the call flow may appear differently from that which is shown in the figure. At step 273, the CPRU network layer passes the information to the CPRU IWU layer with an MNCC_ALERTING indication, if it has not yet received the off-hook indication from the CPRU IWU. The CPRU IWU layer will ignore the message as being invalid for the call state, and wait for further instructions. At step 274, the CO then removes the ringback being applied to the far end, and sends a CONNECT message to the RNC 40 acknowledging the off-hook. At step 275, the connect information is transmitted to the CPRU network layer in a CC_CONNECT message. In response, at step 276, the CPRU network layer conveys the connect information to the CPRU IWU via an MNCC_CONNECT indication. Finally, at step 277, 2-way voice traffic in the previously-established emergency 911 call resumes.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A method of alerting a customer premises equipment coupled to a wireless local loop because of a customer premises equipment on-hook during an emergency 911 call wherein components within the wireless local loop do not perform digit analysis, comprising the steps of:

performing digit analysis at a central office in a public switched telephone network coupled to the wireless local loop to identify that a call is an emergency 911 call;

placing a customer premises radio unit in a pending disconnect state in response to a customer premises equipment on-hook condition wherein said pending disconnect state permits reconnection of the call; and if said performing digit analysis step identifies that the call is an emergency 911 call, transmitting from the central office to the customer premises radio unit an alerting message.

2. The method of claim 1 wherein the customer premises radio unit operates under the DECT protocol.

3. The method of claim 1 wherein the wireless local loop couples to the public switched telephone network through an interface operating under a GR-303 protocol.

4. The method of claim 1 wherein the wireless local loop couples to the public switched telephone network through an interface operating under a SS7 protocol.

5. A method of determining that a CPRU in a wireless loop does not have call control during an emergency 911 call comprising the steps of:

performing digit analysis at a network component in the wireless local loop to identify whether a call is an emergency 911 call;

setting an internal indicator in said network component if said performing digit analysis step identifies that the call is an emergency 911 call wherein call control by a customer premises equipment coupled to the wireless local loop is relinquished;

wherein the network component is a radio node controller; and wherein said setting an internal indicator step comprises sending from the radio node controller to a customer premises unit an IWU-INFO message with an IWU-IWU IE wherein a Protocol Discriminator is set to "GSM Recommendation 04.08, element" (010001), and wherein an Emergency Setup message type is IE (1110).

6. The method of claim 5 wherein the network component is a customer premises radio unit.

7. The method of claim 5 wherein the network component is a customer premises radio unit to communicate according to the DECT protocol.

8. The method of claim 5 wherein the network component is a customer premises radio unit to communicate according to the DECT protocol, and wherein said setting an internal indicator step comprises setting the Basic Service Information Element and a SETUP message generated by the customer premises radio unit to emergency call.

9. The method of claim 5 further comprising the step of transmitting to the customer premises equipment from the network component an alerting message in response to a customer premises equipment on-hook condition.

10. A method of determining that a CPRU in a wireless loop does not have call control during an emergency 911 call comprising the steps of:

performing digit analysis at a network component in the wireless local loop to identify whether a call is an emergency 911 call;

setting an internal indicator in said network component if said performing digit analysis step identifies that the call is an emergency 911 call wherein call control by a customer premises equipment coupled to the wireless local loop is relinquished;

wherein the network component is a radio node controller; and wherein said setting an internal indicator step comprises sending from the radio node controller to a customer premises radio unit an INFO message wherein an Escape to Proprietary Information Element (IE) indicates that a call type is an emergency 911 call type.

11. The method of claim 10 wherein the network component is a customer premises radio unit.

12. The method of claim 10 wherein the network component is a customer premises radio unit to communicate according to the DECT protocol.

13. The method of claim 10 wherein the network component is a customer premises radio unit to communicate according to the DECT protocol, and wherein said setting an internal indicator step comprises setting the Basic Service Information Element and a SETUP message generated by the customer premises radio unit to emergency call.

14. The method of claim 10 further comprising the step of transmitting to the customer premises equipment from the network component an alerting message in response to a customer premises equipment on-hook condition.

15. A method of determining that a CPRU in a wireless loop does not have call control during an emergency 911 call comprising the steps of:

performing digit analysis at a network component in the wireless local loop to identify whether a call is an emergency 911 call;

setting an internal indicator in said network component if said performing digit analysis step identifies that the call is an emergency 911 call wherein call control by a customer premises equipment coupled to the wireless local loop is relinquished;

wherein the network component is a radio node controller; and wherein said setting an internal indicator step comprises sending from the radio node controller to the customer premises radio unit a notify message with an Escape to Proprietary Information Element (IE) that indicates a call type is an emergency 911 call type.

16. The method of claim 15 wherein the network component is a customer premises radio unit.

17. The method of claim 15 wherein the network component is a customer premises radio unit to communicate according to the DECT protocol.

18. The method of claim 15 wherein the network component is a customer premises radio unit to communicate according to the DECT protocol, and wherein said setting an internal indicator step comprises setting the Basic Service Information Element and a SETUP message generated by the customer premises radio unit to emergency call.

19. The method of claim 15 further comprising the step of transmitting to the customer premises equipment from the network component an alerting message in response to a customer premises equipment on-hook condition.

20. A system for alerting a customer premises equipment in an on-hook condition during an emergency 911 call, said customer premises equipment coupled to a wireless local loop wherein components in said wireless local loop do not perform digit analysis, said system comprising:

a radio node controller within said wireless local loop coupled to a telephone network central office; and a customer premises radio unit within said wireless local loop coupled to said customer premises equipment and to said radio node controller, said customer premises radio unit adapted to enter a pending disconnect state upon indication of an on-hook condition at said customer premises equipment wherein said pending disconnect state permits reconnection of a call, said customer premises radio unit alerting said customer premises equipment of the on-hook condition should said central office detect that a call type is an emergency 911 call type.

* * * * *

UNITED STATES PATENT AND TRADEMARK OFFICE
CERTIFICATE OF CORRECTION

PATENT NO. : 6,510,315 B1
DATED : January 21, 2003
INVENTOR(S) : Arnson

It is certified that error appears in the above-identified patent and that said Letters Patent is hereby corrected as shown below:

Column 4,
Line 52, delete "IWYU" and insert -- IWU --.

Column 8,
Line 19, delete "6further" and insert -- further --.

Signed and Sealed this

Twenty-fourth Day of June, 2003

JAMES E. ROGAN
*Director of the United States Patent and Trademark Office*